(No Model.)
A. C. ESTABROOK.
MIRROR.
No. 573,770.  Patented Dec. 22, 1896.
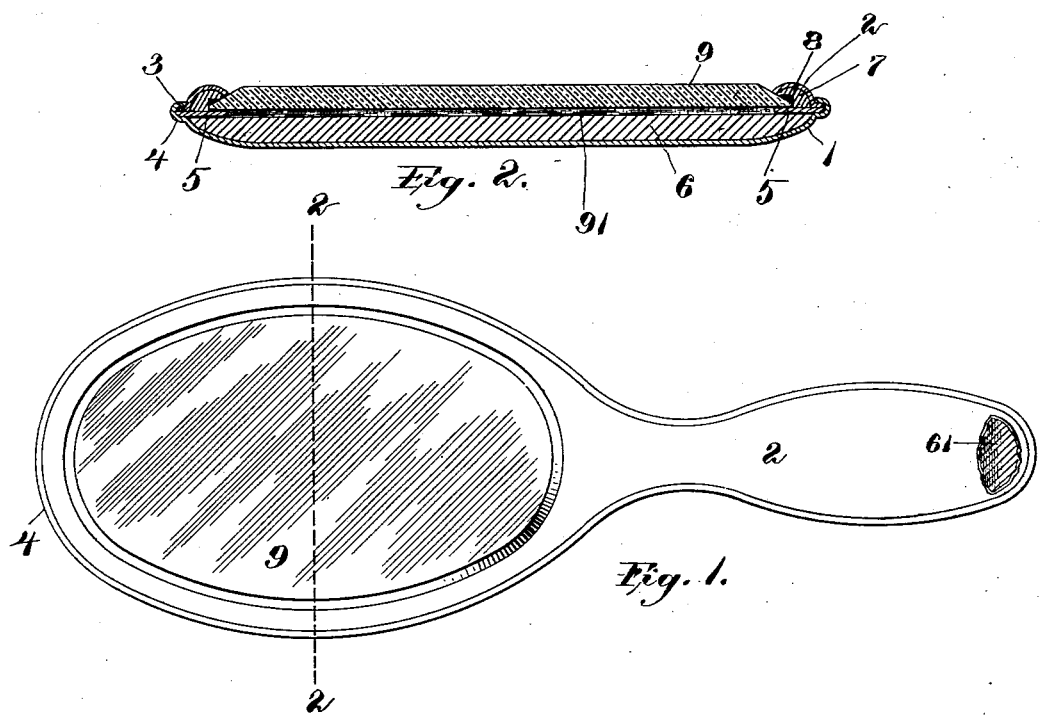
Witnesses:
Arthur E. Randall.
Alice H. Morrison.
Inventor:
Alanson C. Estabrook
by MacLeod Calver & Randall
his Attorneys

UNITED STATES PATENT OFFICE.

ALANSON C. ESTABROOK, OF NORTHAMPTON, MASSACHUSETTS.

MIRROR.

SPECIFICATION forming part of Letters Patent No. 573,770, dated December 22, 1896.

Application filed September 11, 1894. Serial No. 522,717. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Mirrors, of which the following is a specification, reference being had therein to the accompanying drawings.

My invention has for its object to provide a mirror which shall be durable, of superior quality, and of relatively low cost.

The invention will be fully understood from the following description of the manner of constructing a mirror embodying the same.

In the description reference is made to the accompanying drawings, in which—

Figure 1 is plan view of a hand-mirror embodying my invention, part of the face-shell being broken away to show one of the reinforces. Fig. 2 is a view in cross-section on line 2 2 of Fig. 1.

The setting or casing of the mirror is preferably metallic, and is constructed in two parts, a back 1 and a face 2, each of which may be separately considered as a shell. The shells 1 and 2 for the back and face, respectively, are secured together by the engagement or interlocking of the edges thereof in the manner shown. To this end the shell 2 for the face is provided with an outwardly-projecting flange portion 3 and the shell 1 for the back is provided with a flange portion 4, which is folded over the flange 3 of the face, thus securing the face and back firmly together. In order to prevent the bead which is thus formed from being indented or injured by an accidental blow or the like, a reinforce 5, preferably of stiff metal, is inserted, the edge of the reinforce being inserted within the bead formed by the engagement of the flanges above described. This serves to stiffen the bead and prevent it from being readily indented or injured. The reinforce likewise serves to stiffen and strengthen the whole setting of the mirror. The shell 1 for the back, which also extends into and forms a portion of the handle when the mirror is provided with a handle, is strengthened and stiffened by a reinforce 6, of wood. The shells 1 and 2 preferably are made from flat sheets of metal, which are cut to the proper shape and then are given the proper form by means of dies. The reinforce 6, of wood, which first has been shaped to fit, or approximately fit, the interior of the shell for the back, is placed therein and molded under pressure, the proximate surfaces of the said reinforce and of the said shell first being coated with an adhesive, such as shellac. In this operation the reinforce is compressed and molded to the shape of the shell and thereby caused to assume the shape of the interior of the said shell. In like manner the handle portion of the shell 2 for the face will or may be reinforced with wood 6, as indicated in Fig. 1, to prevent it from being indented, as also to stiffen and strengthen it. The portions of the shell for the face which surround the edge of the mirror are reinforced by means of a piece of suitable material, (shown at 7,) which first is formed to the proper shape and then is laid within that portion of the shell for the face which surrounds the edge of the mirror and which has by means of dies, as previously set forth, been given the proper curved shape in cross-section.

The material employed for the reinforce 7 may be varied. I prefer, however, to mold the said reinforce to shape from a plastic composition which will set and harden. In this way the reinforce may be quickly and accurately formed. The said reinforce is recessed, as shown at 8, to receive the edges of the beveled mirror-plate 9. The edges of the plate rest preferably on the metallic reinforce 5 of the bead, but this is not essential, and the said reinforce of the bead may be considerably less in width than is shown in Fig. 2, in which case the edge of the mirror-plate might not project over it.

The portions of the shell 2 for the face which surround the mirror-plate are preferably of the curved shape in cross-section shown, and as the shell is composed of material which is somewhat resilient this portion of the shell for the face acts as a spring and bears against the edge of the mirror-plate 9 with a yielding pressure, thus firmly holding the plate in place. The reinforce 6 of the shell for the back preferably fills the cavity of the said shell, so that the reinforce 5 of the bead will be in contact with the said reinforce 6 at the edge portions thereof, as shown. When the edge of the mirror-plate rests on the metallic reinforce 5 of the bead, a space exists between the back of the mirror-plate and the proximate face of the reinforce 6 of the shell for the back. This space I fill with a sheet of yielding material 91, such as felt, cotton-batting, or the like, thus securing a yielding bed or backing for the mirror-plate. This yielding backing preferably is somewhat thicker than the reinforce 5 of the bead, so that the mirror-plate will rest wholly on the yielding layer of felt or the like, and will thus be securely held between the spring or yielding portions of the shell for the face which surround the edges thereof and the yielding backing layer, and will be prevented from lateral displacement by the reinforce 7 of the shell for the face, which serves not only as a reinforce for the said portions of the shell for the face, but as a means of preventing lateral displacement of the mirror-plate and of centering it properly within the shell for the face. As the yielding backing-layer may be increased or diminished in thickness, mirror-plates of varying thickness may be accommodated, and this is important, inasmuch as plates of the same area and quality are frequently not of uniform thickness.

The various parts being in readiness, the mirror is constructed by placing upon the reinforced shell for its back the reinforce for the bead and the yielding layer or backing for the mirror-plate. The mirror-plate is then placed on the backing and the shell for the face, properly reinforced, is put in position over the edges of the mirror-plate. The flange of the shell for the back is then turned over the flange of the shell for the face, forming a bead which extends around the edge of the mirror and handle and securing the parts firmly together.

What I claim is—

1. A mirror comprising in its construction two metal shells, one for the face and one for the back, united at the edges by interlocking flanges, and a reinforce 7 filling the shell for the face throughout that portion of said shell adjacent the mirror-plate to protect the shell from indentation, said reinforce engaging the edges of the mirror-plate to hold the plate in central position, substantially as described.

2. A mirror comprising in its construction two metal shells, one for the face and one for the back, united at the edges by interlocking flanges, the shell for the face engaging the mirror-plate and serving to hold the said plate in place with a yielding pressure, a reinforce filling the face-shell around the mirror-plate to protect the said shell from indentation and hold the mirror-plate in central position, a reinforce for said back shell, and a yielding backing for the mirror-plate, substantially as set forth.

3. A mirror comprising in its construction two metal shells, one for the face and one for the back, united at the edges by interlocking flanges forming a bead, the said bead containing a reinforce 5 to stiffen said bead and protect the same from indentation or bending, and a reinforce filling the shell for the face throughout that portion adjacent the mirror-plate, and engaging the edges of the mirror-plate to hold the said plate in position, substantially as described.

4. A mirror comprising in its construction two metal shells, one for the face and one for the back, united at the edges by interlocking flanges forming a bead the said bead containing a reinforce to stiffen the same and protect it from indentation and bending, a reinforce filling the shell for the face throughout that portion adjacent the mirror-plate, said reinforce engaging the edges of the mirror-plate and serving to hold the said plate in position, and a yielding backing for the mirror-plate, substantially as described.

In testimony whereof I affix my signature in presence of two witnesses.

ALANSON C. ESTABROOK.

Witnesses:
FRANK N. LOOK,
HENRY S. PECK.